United States Patent
Burns et al.

(10) Patent No.: US 7,564,790 B2
(45) Date of Patent: Jul. 21, 2009

(54) METHOD AND SYSTEM FOR SHAPING TRAFFIC IN A PARALLEL QUEUING HIERARCHY

(75) Inventors: Barry S. Burns, Cary, NC (US); Brian Hiltscher, Cary, NC (US); Mohammed Ismael Tatar, Kanata (CA); Tim Webster, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 688 days.

(21) Appl. No.: 11/069,738

(22) Filed: Feb. 28, 2005

(65) Prior Publication Data

US 2006/0193256 A1    Aug. 31, 2006

(51) Int. Cl.
*G01R 31/08* (2006.01)

(52) U.S. Cl. ............... 370/235; 370/230; 370/468; 370/437

(58) Field of Classification Search ......... 370/229–236, 370/412, 413
See application file for complete search history.

(56) References Cited

U.S. PATENT DOCUMENTS

| | | | |
|---|---|---|---|
| 5,864,540 A | 1/1999 | Bonomi et al. | |
| 6,130,878 A | 10/2000 | Charny | |
| 6,147,970 A * | 11/2000 | Troxel | 370/235 |
| 6,314,110 B1 * | 11/2001 | Chin et al. | 370/468 |
| 6,408,005 B1 | 6/2002 | Fan et al. | |
| 2003/0067877 A1 | 4/2003 | Sivakumar et al. | |
| 2004/0081165 A1 | 4/2004 | Carr et al. | |
| 2004/0174883 A1 | 9/2004 | Johansson et al. | |
| 2004/0179535 A1 | 9/2004 | Bertagna | |

* cited by examiner

*Primary Examiner*—Bob A Phunkulh
(74) *Attorney, Agent, or Firm*—Cindy Kaplan

(57) ABSTRACT

A method and system for shaping traffic in a multi-level queuing hierarchy are disclosed. The hierarchy includes a high priority channel and a low priority channel, wherein traffic on the low priority channel is fragmented and interleaved with traffic from the high priority channel and traffic combined from the high priority and low priority channels has a maximum shape rate. The method includes linking a high priority token bucket to a low priority token bucket, transmitting data from the high priority channel, and decrementing the low priority token bucket by an amount corresponding to the data transmitted. Data is transmitted from the low priority channel only if the low priority bucket has available tokens.

18 Claims, 4 Drawing Sheets

METHOD AND SYSTEM FOR SHAPING TRAFFIC IN A PARALLEL QUEUING HIERARCHY

BACKGROUND OF THE INVENTION

The present invention relates generally to communication networks and more specifically to systems and methods for shaping network traffic in a queuing hierarchy using link fragmentation and interleaving.

High speed networks are designed to carry services with a wide range of quality-of-service (QoS) requirements. It is useful to define a hierarchy of traffic classes over which QoS requirements may be configured. FIG. 1 depicts an example of such a hierarchy. There are three levels. The bottom level or root is a node 102 defining a physical interface over which traffic will be transmitted. The physical layer represents all physical layer entities, such as Ethernet ports, TDM channels, POS ports, clear channel ports, etc. The next level of hierarchy shows three logical interfaces 104, 106, 108. The logical layer represents those interfaces that have virtual circuits, such as frame relay (FR) or virtual LANs (VLANs). A third level of hierarchy consists of classes. Here logical interface 104 has associated classes 110 and 112. Logical interface 106 has classes 114, 116, and 118. Logical interface 108 has associated classes 120 and 122. The class layer contains packet queues where packets are queued awaiting transmission. Each class may represent, for example, a different customer.

Thus, all of the classes, logical interfaces, and physical interfaces are represented by nodes in a tree structure. The nodes corresponding to the classes are leaf nodes, i.e., they are furthest from the root node in the hierarchy. When packets arrive they are placed in a queue associated with a leaf node. Individual nodes can be configured as priority nodes. In FIG. 1, priority nodes are drawn with dashed lines. Priority nodes have higher scheduling preference than their siblings regardless of the other scheduling criteria. For example, voice traffic may be assigned to a priority class.

Link Fragmentation and Interleaving (LFI) is a method used on low speed interfaces to allow higher priority traffic to move ahead or be interleaved with lower priority traffic. Large packet size, lower priority traffic is typically fragmented into smaller chunks in order to provide opportunities for higher priority traffic to be injected into the packet stream.

In conventional systems, the fragmentation and interleaving function was performed in software and a physical framer had no knowledge that LFI was being performed. Thus, from a software perspective, a single physical interface was used and flow control was represented as a single entity. More recently developed framer chips have incorporated some of the LFI functionality into hardware. These framers now represent the single physical interface as two separate interfaces: one for high priority traffic (non-fragmented), which is to be interleaved with the lower priority traffic, and the second interface for low priority traffic which will be fragmented into smaller chunks. While this offers several advantages over software, it introduces a new problem that software must solve and that is the management of flow control and physical interface shaping across two interfaces.

There is, therefore, a need for a method and system which allows multiple traffic flows to be shaped as if they were a single flow while designating one of the flows to be unrestricted.

SUMMARY OF THE INVENTION

A method and system for shaping traffic in a multi-level queuing hierarchy are disclosed. The hierarchy includes a high priority channel and a low priority channel, wherein traffic on the low priority channel is fragmented and interleaved with traffic from the high priority channel and traffic combined from the high priority and low priority channels has a maximum shape rate. The method includes linking a high priority token bucket to a low priority token bucket, transmitting data from the high priority channel, and decrementing the low priority token bucket by an amount corresponding to the data transmitted. Data is transmitted from the low priority channel only if the low priority bucket has available tokens.

In another aspect of the invention, a system for shaping traffic generally comprises a shaping device comprising a real-time token bucket shared between a high priority device and a low priority device. The token bucket has a fill rate corresponding to the maximum shape rate. The shaping device is configured to decrement the token bucket by an amount corresponding to data transmitted from the high and low priority channels. Data is transmitted from the low priority channel only if the token bucket has available tokens and data is transmitted from the high priority channel regardless of the token availability.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention operates in the context of a data communication network including multiple network elements. Some of the elements in a network that employs the present invention may be network devices such as routers and switches. A traffic management system or network processor utilizing the method and system described herein may be located in one or more of the network elements. The system may be used, for example, in a router or switch platform that performs queuing and packet scheduling, or any device that is attempting to shape multiple traffic streams.

The system and method described herein allow multiple traffic flows to be shaped as if they were a single flow while designating one of the flows to be unrestricted. The system uses Link Fragmentation and Interleaving (LFI) to allow higher priority traffic to be sent in front of lower priority traffic. The lower priority packets are fragmented and interleaved on a physical link with higher priority packets. In one embodiment, the system disclosed herein may implement LFI in hardware on, for example, a shared port adapter (SPA), while software (or hardware) is utilized to manage flow control and physical interface shaping across the high priority traffic interface and the low priority traffic interface. It is to be understood that changes may be made to the system without departing from the scope of the invention. For example, a physical layer interface module (PLIM) or other suitable device may be used in place of the SPA.

Figure 1:
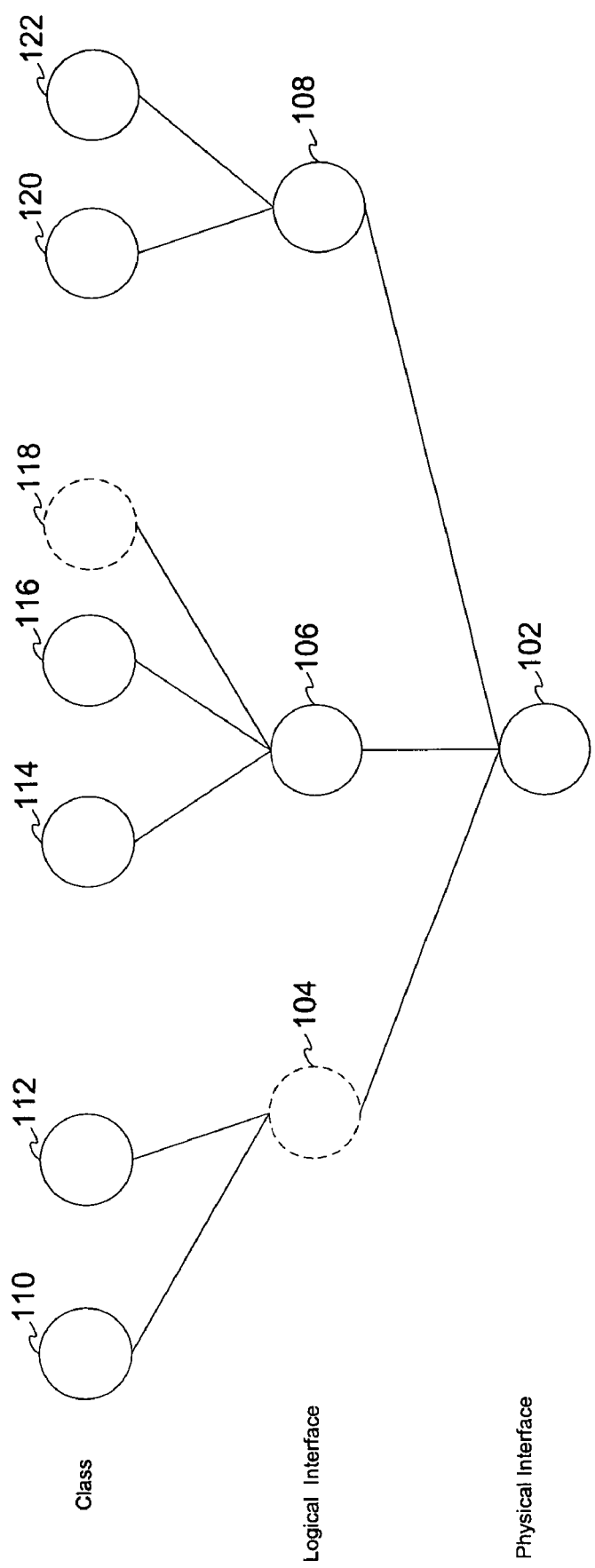
FIG. 1 illustrates a tree that represents a class hierarchy.

The present invention is described below with reference to a particular example as it applies to three layers of hierarchy, as previously described with respect to FIG. 1. The present invention is, however, not limited to any particular number of hierarchy levels, number of priority levels, or number or arrangement of nodes. For example, a configuration may include only a single layer, three layers, five layers, or any other number of layers.

Figure 2:
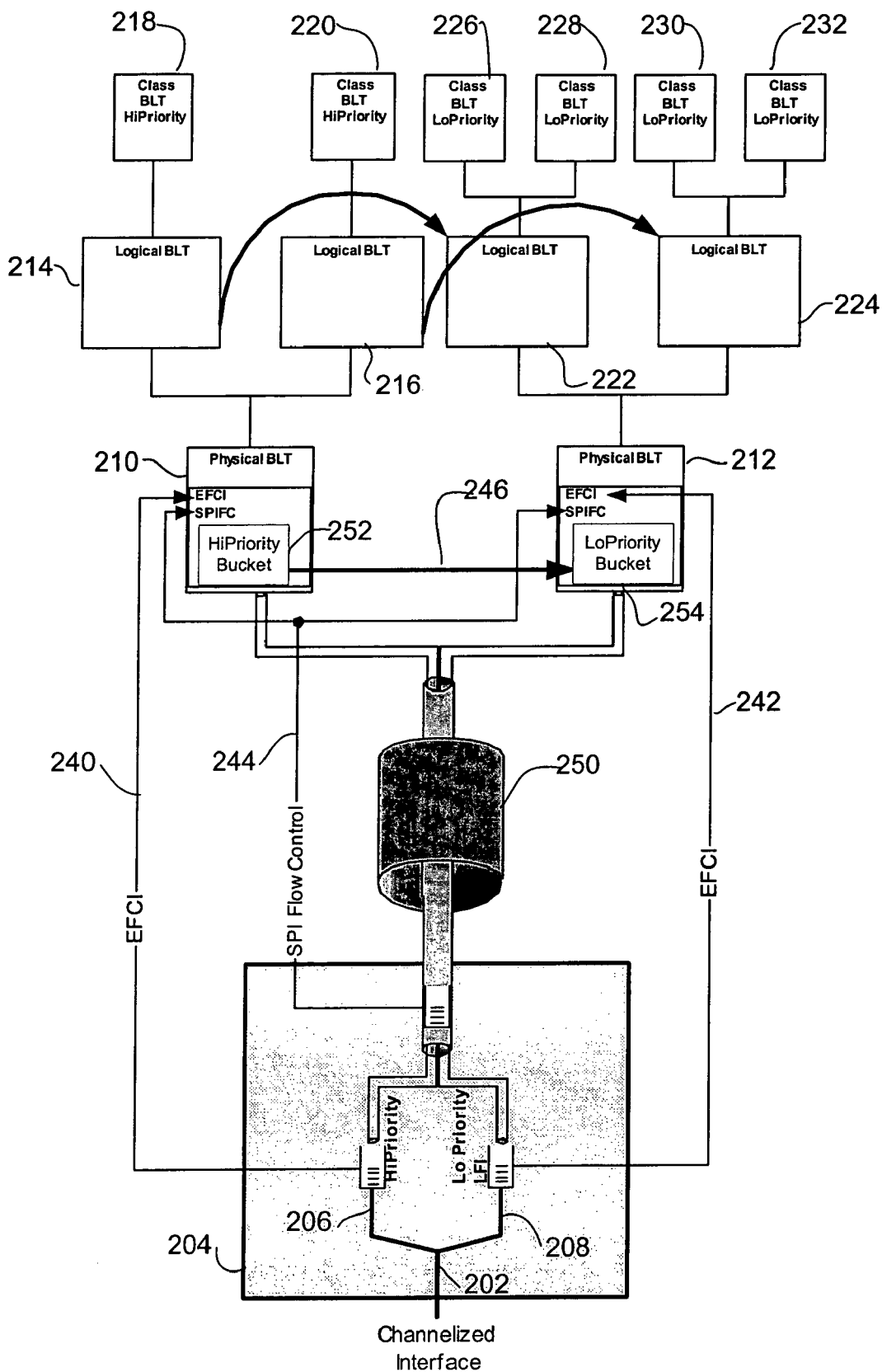
FIG. 2 illustrates a queuing hierarchy for use in one embodiment of the present invention.

One embodiment of a parallel queuing hierarchy of the present invention is shown in FIG. 2. The hierarchy includes three layers: physical (nodes 210, 212 and interface 202); logical (nodes 214, 216, 222, 224); and class or leaf layer (nodes 218, 220, 226, 228, 230, 232). The system includes a single channelized port 202 with LFI configured on the port. Port adapter or interface module (e.g., SPA or PLIM) 204 implements LFI by assigning two extended channels 206, 208 to the physical port. Data from the physical nodes 210, 212 is transmitted to the port adapter 204 via a SPI (System Packet Interface) 250 or other suitable link. Channel 206 is for high priority traffic and channel 208 is for lower priority traffic (LFI traffic). Traffic destined to the LFI channel 208 is fragmented and interleaved with the traffic from the high priority channel 206.

The entities at the physical, logical, and class layers are bandwidth limited traffic streams (BLT). Each of the channels is assigned their own physical layer BLT, so that the high priority and low priority traffic destined for the channelized port 202 do not mix until they reach the port adapter 204. The bandwidth limited traffic stream is a stream or flow of packets, whose maximum bandwidth is constrained or limited in some manner. An example of a BLT at the physical layer is the physical interface. The entire stream of packets destined for a particular physical interface is constrained by the maximum bandwidth of the interface. The physical layer schedules and shapes logical layer BLTs. An example of a BLT at the logical layer is a frame relay virtual circuit (VC). Each of the BLTs at the logical layer may be assigned a guaranteed minimum bandwidth, maximum bandwidth, etc. The BLTs at the class layer contain configuration and state parameters for a specific class.

In the example shown in FIG. 2, the hierarchy includes two physical BLTs 210, 212. The hierarchy further includes logical BLTs 214, 216 for the high priority extended channel 206. A single class BLT 218, 220 is assigned to each of the high priority logical BLTs 214, 216, respectively. The hierarchy for the low priority extended channel 208 is a mirror image of the physical and logical layers and includes physical BLT 212 and logical BLTs 222, 224. Thus, for each high priority physical and logical BLT there is a corresponding low priority physical and logical BLT. In the example shown in FIG. 2, there are multiple class BLTs 226, 228, 230, 232 feeding the low priority logical BLTs 222, 224.

Since both of the extended channels 206, 208 are assigned to the same physical channelized port, their aggregate bandwidth is that of the physical link. Each of these channels report an Extended-channel Flow Control Information (EFCI) status based on their own egress FIFO depth to their respective physical layer BLT. Arrows 240, 242 in FIG. 2 represent the EFCI status reported from the extended channel's egress FIFO to the physical layer BLT of the respective channel. The physical layer BLT is preferably shaped to a rate that is slightly higher than the physical link speed to avoid being heavily reliant on the ECFI system to limit traffic. SPI (System Packet Interface) port level flow control is also reported to each physical layer BLT (represented by line 244 in FIG. 2).

In the diagram shown in FIG. 2, it is assumed that the high priority traffic does not need to be shaped (i.e., the input rate is less than the maximum output rate assigned to the physical or virtual interface). This constraint may be provided, for example, by policing or rate limiting the high priority traffic. However, the amount of high priority traffic transmitted on the physical (or virtual) interface has to be accounted for when determining the maximum rate for all traffic on that interface. For example, if the physical interface has a maximum rate of 10 Mbps and the high priority traffic consumes 1 Mbps, then the low priority traffic must be shaped to 9 Mbps. But since the rate of the high priority traffic is dynamic, the shape rate of the low priority traffic is adjusted dynamically.

The shaping mechanism utilizes a real-time token bucket scheme. Tokens are added to the bucket per unit time and tokens are removed from the bucket for each packet transmitted. The fill rate of the bucket is equivalent to the maximum shape rate the traffic stream must conform to. Tokens may be equal to, for example, a byte of data.

The system links the high priority data structure's token bucket 252 to the low priority data structure's token bucket 254. As shown at arrow 246 of FIG. 2, the high priority BLT 210 contains a pointer to the LFI BLT 212 in order to adjust tokens. The two parallel traffic streams thus, share the same token bucket. As packets are transmitted on the high priority traffic flow, the high priority packets cause the shared token bucket to be decremented, thus restricting the flow of the low priority traffic. The high priority traffic flow can choose whether or not to ignore the token bucket state (i.e., it can choose to conform to the shape/police rate or it can choose not to conform). If the high priority traffic flow chooses to not conform to the shape/police rate, then other mechanisms, such as policer, may be used to guarantee that the high priority traffic does not exceed the shape/police rate.

Each token bucket is configured to receive a certain number of tokens per unit time. The token bucket is then decremented each time a packet is transmitted by the number of bytes transmitted. It is to be understood that the token bucket may be decremented by any value corresponding to the data transmitted (e.g., packet length or a factor of bytes transmitted). At the same time tokens are added back to the bucket, by taking the delta in time since the last transmission and multiplying it by the shape rate. If the token bucket goes negative, then the BLT is deemed ineligible for transmission by the scheduler. It is then placed on a real time calendar (RTC) so that at some specified time in the future, the BLT can be made eligible for transmission.

Figure 3:
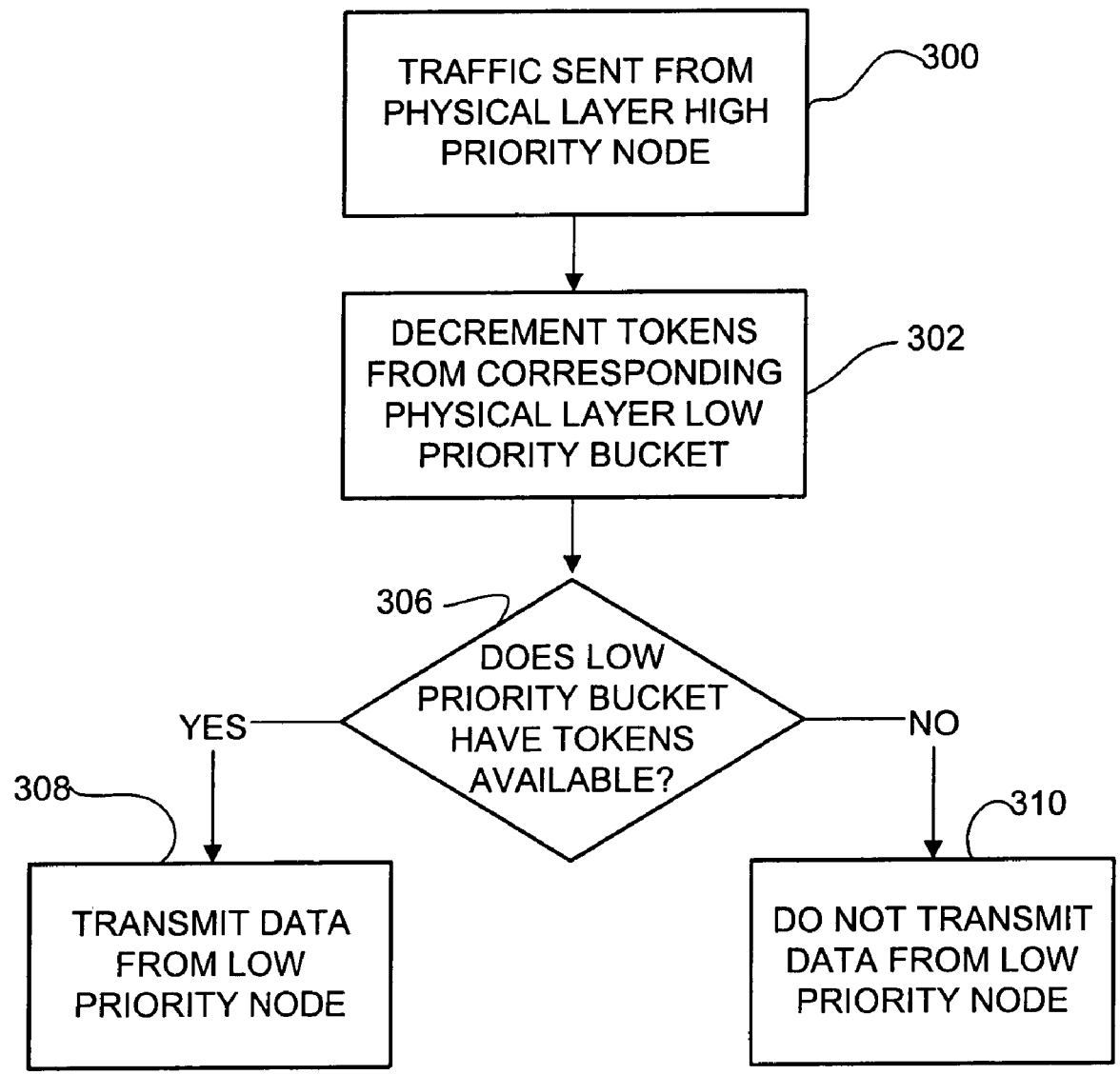
FIG. 3 is a flowchart illustrating a process for shaping traffic according to one embodiment of the present invention.

FIG. 3 is a flowchart illustrating an example of a process for shaping traffic flows utilizing the system described herein. Traffic is sent from the physical layer high priority BLT at step 300. The physical layer's high priority BLT 210 decrements tokens from the physical layer's low priority/LFI BLT 212 for traffic being sent from the high priority BLT (step 302). The high priority BLT 210 thus, steals the bandwidth from the LFI BLT 212 by decrementing its tokens and the high priority BLT is shaped only to prevent overrunning the FIFO on the port adapter 204. This results in the non-LFI traffic decrementing two token counters (one for itself and one for its associated LFI (buddy) BLT). The LFI BLT 212 checks to see if it has tokens available (step 306) and only transmits data if it finds available tokens (steps 308 and 310).

Since logical interfaces are very similar to their physical counterpart in that they have specific maximum bandwidth assignments, the aggregation of the high priority logical BLTs 214, 216 and the low priority logical BLTs 222, 224 should not exceed the maximum bandwidth assigned to the logical interface. To prevent this, the high priority logical BLTs 214, 216 have a pointer pointing to the corresponding low priority logical BLT 222, 224, respectively, as shown in FIG. 2. The high priority logical BLT 214, 216 decrements the tokens of its mirrored low priority logical BLT 222, 224 to prevent the aggregate bandwidth of the logical interface from exceeding its limits.

The system and method described above may also be used as a policing mechanism. For example, it is possible to cross multiple policing flows to a single policer, while allowing one or more of the flows not to be restricted by the policer.

The above procedure assumes only a single level of priority for priority traffic. There may be, however, multiple priority levels. This can be addressed by providing multiple priority sub-trees, each corresponding to a priority level. Pointers would then extend from all of the priority sub-trees to the single non-priority sub-tree.

Figure 4:
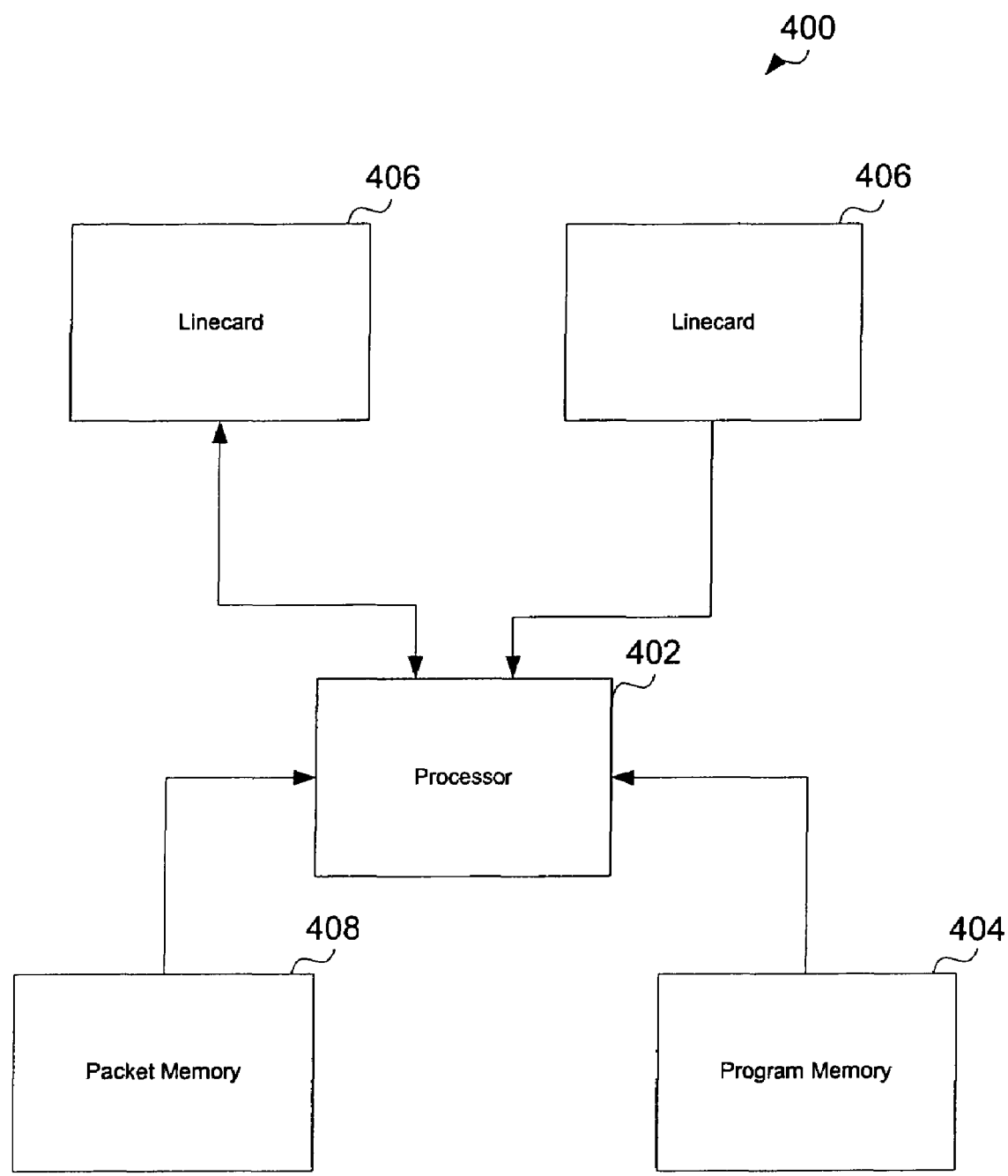
FIG. 4 depicts a network device useful in implementing embodiments of the present invention.

FIG. 4 depicts a network device 400 that may be used to implement a device that operates the hierarchies shown in FIG. 2 and the scheduling technique of FIG. 3. In one embodiment, network device 400 is a programmable machine that may be implemented in hardware, software or any combination thereof. A processor 402 executes code stored in a program memory 404. Program memory 404 is one example of a computer-readable medium. Program memory 404 can be a volatile memory. Another form of computer-readable medium storing the same codes would be some type of non-volatile storage such as floppy disks, CD-ROMs, DVD-ROMs, hard disks, flash memory, etc.

Network device 400 interfaces with physical media via a plurality of linecards 406. Linecards 406 may incorporate Ethernet interfaces, DSL interfaces, Gigabit Ethernet interfaces, 10-Gigabit Ethernet interfaces, SONET interfaces, etc. As packets are received, processed, and forwarded by network device 400, they may be stored in a packet memory 408. Network device 400 implements all of the scheduling features provided by the present invention.

Packet transmission operations may occur partially or completely within one of linecards 406. To implement functionality according to the present invention, linecards 406 may incorporate processing and memory resources similar to those discussed above in connection with the network device as a whole.

As can be observed from the foregoing, the method and system described herein have many advantages. As previously described, two traffic streams are kept separate until they are actually transmitted over the physical media. The separation allows for a higher level of guarantee that the proper transmission/QoS policies can be applied to the traffic streams individually. Once the streams are combined into a single queuing entity, it is very difficult to apply controls to allow the desired transmission behavior.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for shaping traffic in a multi-level queuing hierarchy comprising a high priority channel and a low priority channel, the method comprising:
   assigning a bandwidth limited traffic stream to each of said high priority and low priority channels;
   fragmenting and interleaving traffic on the low priority channel with traffic from the high priority channel;
   shaping traffic combined from the high priority and low priority channels as a single traffic flow based on said bandwidth limited traffic streams;
   linking a high priority token bucket to a low priority token bucket;
   transmitting data from the high priority channel and decrementing the low priority token bucket by an amount corresponding to the data transmitted; and
   transmitting data from the low priority channel only if the low priority bucket has available tokens.

2. The method of claim 1 wherein transmitting data from the high priority channel comprises transmitting data regardless of a state of the high priority token bucket.

3. The method of claim 1 wherein the fragmenting and interleaving of traffic is performed in hardware.

4. The method of claim 1 wherein the high priority and low priority channels are combined at a shared port adapter.

5. The method of claim 1 wherein the hierarchy includes three layers.

6. The method of claim 5 wherein the hierarchy includes a physical layer, a logical layer, and a class layer.

7. The method of claim 1 further comprising each of the channels reporting an extended-channel flow control information status to respective physical layer nodes.

8. The method of claim 1 further comprising reporting system packet interface port level flow control to physical layer nodes.

9. A system for shaping traffic in a multi-level queuing hierarchy comprising a high priority channel and a low priority channel, the system comprising:
   a shaping device configured to assign a bandwidth limited traffic stream to each of said high priority and low priority channels, fragment and interleave traffic on the low priority channel with traffic from the high priority channel, and shape traffic combined from the high priority and low priority channels as a single traffic flow based on said bandwidth limited traffic streams;
   a low priority token bucket; and
   a high priority token bucket linked to said low priority token bucket;
   wherein the low priority token bucket is decremented by an amount corresponding to data transmitted from the high priority token bucket and data is transmitted from the low priority channel only if the token bucket has available tokens and data is transmitted from the high priority channel regardless of the token availability.

10. The system of claim 9 wherein the high priority and low priority channels are combined at a shared port adapter.

11. The system of claim 9 wherein the hierarchy includes a physical layer, a logical layer, and a class layer.

12. The system of claim 11 wherein high priority logical nodes comprise pointers to at least one low priority logical node.

13. A computer-readable storage medium encoded with a computer program for shaping traffic in a multi-level queuing hierarchy comprising a high priority channel and a low priority channel, the computer program comprising:
- code that assigns a bandwidth limited traffic stream to each of said high priority and low priority channels;
- code that fragments and interleaves traffic on the low priority channel with traffic from the high priority channel;
- code that shapes traffic combined from the high priority and low priority channels as a single traffic flow based on said bandwidth limited traffic streams;
- code that causes linking of a high priority token bucket to a low priority token bucket;
- code that causes transmission of data from the high priority channel and decrements the low priority token bucket by an amount corresponding to the data transmitted; and
- code that causes transmission of data from the low priority channel only if the low priority bucket has available tokens.

14. The computer-readable storage medium of claim 13 wherein code that causes transmission of data from the high priority channel comprises code that causes transmission of data regardless of a state of the high priority token bucket.

15. The computer-readable storage medium of claim 13 further comprising code that reports an extended-channel flow control information status to respective physical layer nodes.

16. A system for shaping traffic in a multi-level queuing hierarchy comprising a high priority channel and a low priority channel, comprising:
- means for assigning a bandwidth limited traffic stream to each of said high priority and low priority channels;
- means for fragmenting and interleaving traffic on the low priority channel with traffic from the high priority channel;
- means for shaping traffic combined from the high priority and low priority channels as a single traffic flow based on said bandwidth limited traffic streams;
- means for linking a high priority token bucket to a low priority token bucket;
- means for transmitting data from the high priority channel and decrementing the low priority token bucket by an amount corresponding to the data transmitted; and
- means for transmitting data from the low priority channel only if the low priority bucket has available tokens.

17. The system of claim 16 further comprising means for combining the high priority and low priority channels at a shared port adapter.

18. The system of claim 16 further comprising means for policing data on the high priority and low priority channels.

* * * * *